Apr. 10, 1923.
W. HOLTORP
BEARING
Filed July 2, 1920
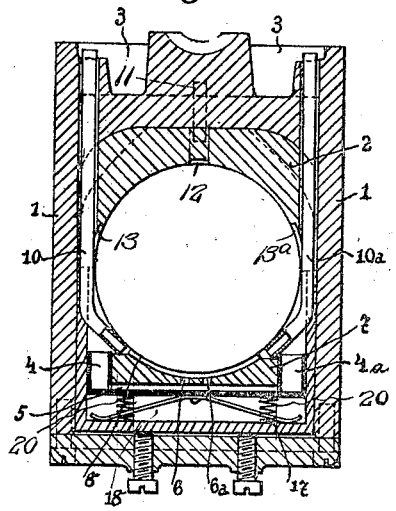
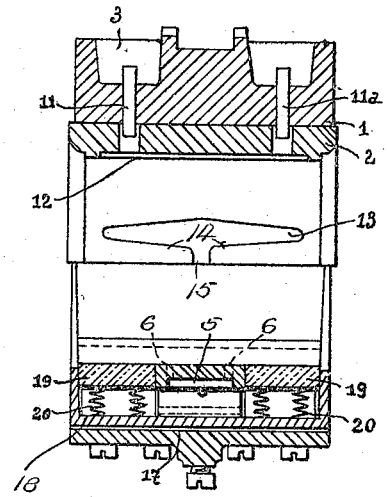
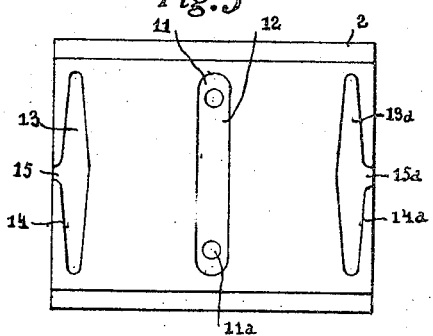
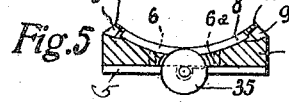
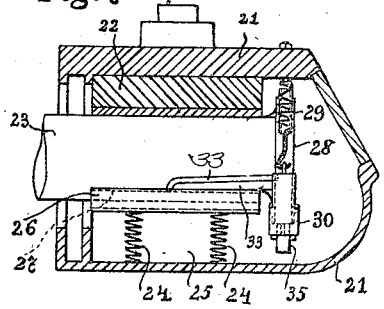
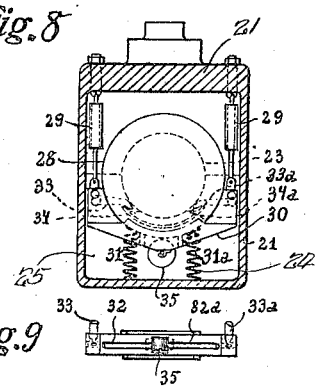
Inventor:
Wilhelm Holtorp Patented Apr. 10, 1923.

1,451,222

UNITED STATES PATENT OFFICE.

WILHELM HOLTORP, OF HAMBURG, GERMANY.

BEARING.

Application filed July 2, 1920. Serial No. 393,746.

*To all whom it may concern:*

Be it known that I, WILHELM HOLTORP, a citizen of the German Empire, residing at Hamburg, Germany, have invented certain new and useful Improvements in Bearings, of which the following is a specification.

My invention refers to bearings and more especially to an improved device for lubricating them.

The bearings of the kind known having brasses, such for instance, as those used in connection with locomotive and ordinary car axles, are so constructed that the revolving pivot or axle journal bears against a felt pad saturated with oil, and is thus lubricated. Now, as will be obvious, the drawback in this arrangement is that the pad is apt to quickly wear down and the lubricating means to get soiled, so that in short, the revolving member will not be lubricated as required, causing the axles frequently to run hot.

The object of the present invention is to provide a device in which the thorough lubrication of the parts is secured along with an ample supply of the lubricant, and this by the fact of the flow of said lubricant being conducted by a shoe, acting as wiper, disposed on the outside of the brasses and bearing up against the journal to a collector, whence the lubricating means are caused to flow back into the main oil receiver by the rotation of the journal. The shoe is so constructed as to embrace a portion of the journal in a manner which will enable said shoe to wipe off the oil from said journal after the oil has left the brasses so that it is led to the collector from where, by aid of suitable guide members arranged within and without the shoe, it is again enabled to attain the journal which, by means of these guide members, again leads the oil on to additional oil guide means communicating with the main oil receiver.

Owing to reasons of a constructional nature, the main oil receiver cannot in the case of car axles. be arranged above the bearings, so that the oil cannot be supplied to the bearings from above. In this particular case the collar fixed in the usual manner to the axle journals of the car axles is made use of as an oil feeder, and this in the way above described relatively to the journal. In this modified construction the collar likewise moves in a shoe having apertures through which the oil is drawn up in the course of the rotation of the collar, and is caused to flow along grooves till it reaches additional oil guide members which leads it on to the journal. In this case the main oil receiver and the oil collector are one, so that the oil supplied to the oil pad, acting as wiper in consequence of the rotation of the journal, is again caused to flow back into the same receptacle.

However, to secure the efficiency of the lubricating device even in the event of the oil not reaching the oil guide means, or the apertures leading to these being stopped up, there may be provided either within or without the shoe a small feed roller which dips into the oil. This feed roller may be rotated by either the journal or collar, whereby the oil guide members are supplied with oil.

Different modifications of a bearing embodying my invention are shown by way of illustration in the accompanying drawings, in which Fig. 1 shows a vertical cross section, and Fig. 2 a vertical longitudinal section of the improved device having a direct lubricating arrangement for the journal.

Fig. 3 a diagram of the brasses,

Fig. 4 a cross-section of the type of shoe used in the form of construction according to Figs. 1 and 2, Fig. 5 a like view of said shoe with a feed roller disposed therein, Fig. 6 a diagram of the same, Fig. 7 is a longitudinal section, and Fig. 8 a cross section of a bearing lubricated by aid of the collar fixed to the journal, Fig. 9 is a top view of the shoe enclosing the collar and containing the oil guide member.

Referring to Figs. 1 to 4 and 6 of the drawings, brasses 2 are disposed in a frame 1, the main oil receiver 3 being arranged on top. Underneath the axle, i. e. within the lower portion of the frame 1, there is provided a two part receptacle 4, 4ª, the two sections of which are in communication with each other by means of a groove or box 5 formed in a metal pad 7. This latter is furthermore provided with two pairs of bores 6, 6ª serving to establish communication between the face of the metal pad that bears up against the axle and the groove, or bores 5. The bores 6, 6ª terminate in grooves 8, 8ª

Fig. 6 formed in said face and communicating with bores 9, 9ª which for their part again terminate in ascending pipes 10, 10ª communicating with the oil receiver 3. The receiver is connected to the brasses 2 in known manner by means of lubricating bores or nipples 11, 11ª the orifices of which are united by a groove 12. To either side of the brasses are disposed pockets 13, 13ª the edges 14, 14ª of which, Fig. 3, are so devised as to force the oil to flow along the axle to the collecting and discharge points 15, 15ª, whence it may be taken along by the axle or shaft till the wiper edges 16, 16ª of the metal pad are reached.

By means of a spring 17 bearing against the bottom of an oil receptacle 18 disposed within frame 1, both the containers 4, 4ª as also the metal pad 7 are forced against the axle in order to secure the proper cooperation of these parts. Besides said metal pad, there are also provided in known manner felt pads 19 which are forced against the axle by means of springs 20 and which communicate with the receptacle 18 last-mentioned.

In the modification illustrated in Figs. 7 to 9 the brasses 22 mounted on the journal 23 are disposed within the casing 21. A felt pad 27 surrounded by a sheet metal cover 26 and whose edges extend beyond the edges of the felt pad to form a lateral oil receiving channel or groove is forced against journal 23 by springs 24 bearing up against the underside of said casing and the bottom of the casing 21 constituting a combined collector and main oil container 25. A collar 28 disposed on the journal is embraced by a shoe 30 forced against it by the action of tension springs 29, said shoe being provided with bores 31, 31ª establishing communication between the oil container 25 and the side of the shoe adjacent to collar 28, and terminating in grooves 32, 32ª. These latter again communicate with pipes 33, 33ª, which for their part discharge in grooves 34, 34ª formed by journal 23, felt pad 29, and sheet metal cover 26.

In the case of both forms of construction there may be arranged below the journal or collar a small feed roller 35 (Figs. 5 to 9), arranged in the one hand, to dip into the oil, and on the other making contact with the rotating member by means of which it may be caused to revolve.

The manner of operation of the device applied to the bearing shown in Figs. 1 to 5 is as follows:

The lubricant flows from the main oil container 3 through the nipples or bores 11 into the groove 12, where it spreads and is taken along by the rotating members as far as the sharp edges 14 or 14ª of the pockets 13 or 13ª (according to the direction in which the said member revolves). The edges 14 and 14ª, respectively, cause the oil to flow towards the points 15 and 15ª, respectively, where it is taken up and along by the rotating axle till the edges 16, 16ª are reached. Here the oil is wiped off and conducted to the containers 4, 4ª, whence it flows into groove 5. In consequence of the suction action exerted by the shaft, the oil is drawn up through the apertures 6, 6ª, conducted to the grooves 8, 8ª, then forced through the bores 9, 9ª, from where it returns in the manner hereinbefore described through the ascending pipes 10, 10ª into the main oil container 3.

In the case of the modification illustrated in Figs. 7 to 9 the manner of operation is as follows:

The oil contained in the main container 25 (the shoe extending into the same for the height of the collar) is drawn up by the bores 31, 31ª formed in the shoe 30 as the collar 28 turns in the clockwise direction, and then forced by the groove 32 into the pipe 33, whence it reaches the channel 34 and the felt pad 27. The journal is thoroughly lubricated by the felt pad, mainly however by the oil contained in the channel 34, the said journal wiping the oil off again on the felt pad close to the channel 34ª, whence by overflowing across the sheet metal cover 26 it finally attains the container 25.

On the rotation being reversed, the oil flows through bore 31ª, along groove 32ª, through pipe 33ª to channel 34ª, and from here by means of the journal to channel 34. In the event of the oil not reaching the level of the rotating member, or of the bores 6, 6ª (Figs. 1, 4, 5, 6) or 31, 31ª (Figs. 7 to 9) being stopped up, it is supplied to these parts by means of the small feed roller 35.

I claim:

1. In a journal bearing, a lubricant container, means for conducting the lubricant from the container onto the journal, a lubricant collector, a shoe provided with means for conducting the lubricant from the journal to the collector, and means for conducting the lubricant from the latter to the container.

2. In a journal bearing, a main lubricant container, means for conducting the lubricant from the container onto the journal, a shoe below the journal having means for wiping the lubricant from the latter, a collector arranged to receive lubricant from the shoe, and means including the shoe whereby the lubricant is conducted from the collector back to the container.

3. In a journal bearing, a main lubricant container, means for conducting the lubricant from the container onto the journal, a shoe below the journal having wiping edges engaging the journal, collectors arranged to receive the lubricant from said edges and communicating with the shoe through apertures formed in the latter, and conduits through which the lubricant is conducted from the shoe to the container.

4. In a journal bearing, a main lubricant container, means for conducting the lubricant from the container onto the journal, a shoe provided with ducts arranged below the journal, lubricant collectors communicating with said ducts, and conduits connecting the latter with the lubricant container.

5. In a journal bearing a main lubricant container, means for conducting lubricant from the latter to the journal having ducts therein, and wiping edge engaging the journal, collectors arranged to receive the lubricant from said edges and communicating with said ducts, and conduits connecting the latter with the main container.

6. In a bearing in combination, a journal, a collar on said journal, a main lubricant container, a brass applied against said journal, a shoe partly embracing said collar and dipping into said container, ducts in said shoe and further ducts connected therewith and serving to convey lubricant to said journal.

In testimony whereof I affix my signature.

WILHELM HOLTORP.